Dec. 18, 1956 A. ZUCKERMANN 2,774,895
EDDY CURRENT BRAKE

Filed Sept. 21, 1953 2 Sheets-Sheet 1

Dec. 18, 1956  A. ZUCKERMANN  2,774,895
EDDY CURRENT BRAKE
Filed Sept. 21, 1953  2 Sheets-Sheet 2
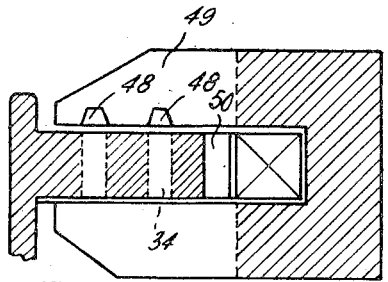
Fig. 8.
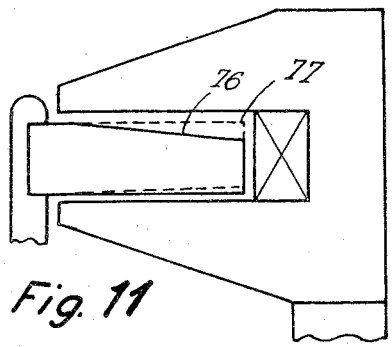
Fig. 11.
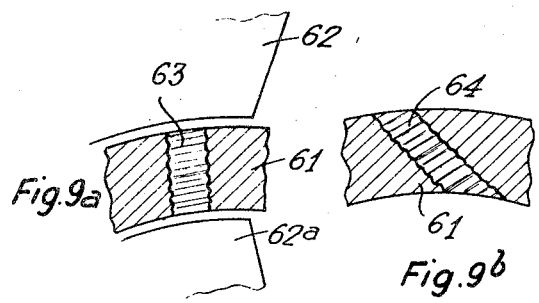
Fig. 9a.  Fig. 9b.
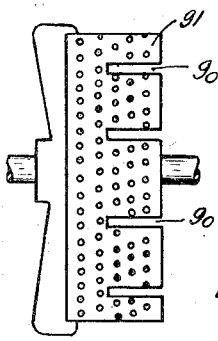
Fig. 12.
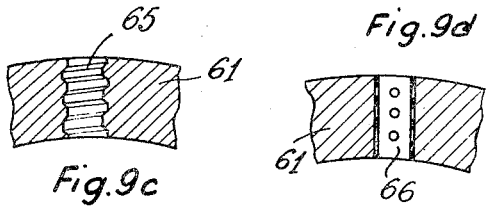
Fig. 9c.  Fig. 9d.
Fig. 9e.
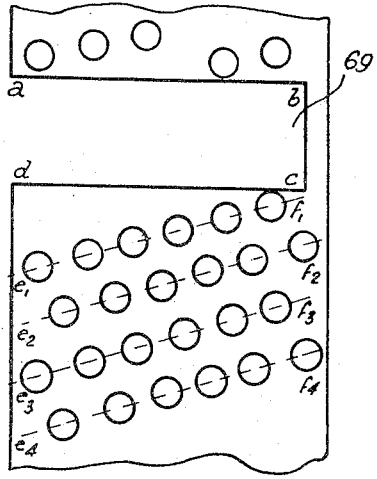
Fig. 13.
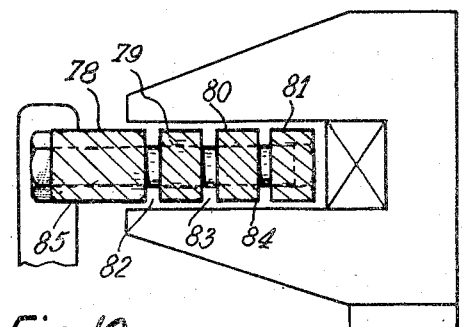
Fig. 10.

United States Patent Office 2,774,895
Patented Dec. 18, 1956

2,774,895
EDDY CURRENT BRAKE
Armand Zuckermann, Paris, France

Application September 21, 1953, Serial No. 381,205

Claims priority, application France September 23, 1952

25 Claims. (Cl. 310—93)

This invention relates in general to eddy current brakes and more particularly to improvements in electrodynamic eddy current brakes of the homopolar type comprising a magnetic armature showing, on one side of the body in which the eddy currents are developed, a series of pole teeth all of same sign and, on the opposite side of said body, a series of pole pieces all of the other sign, the rotor in which the eddy currents are originated having for example the shape of a cylinder of revolution connected to the movable brake member, and the armature being preferably stationary.

In devices of the type broadly defined hereinabove the retarding torque occasioned by the production of eddy currents is theoretically proportional to the square of the magnetic induction flux circulating through the active surfaces of the body in which these eddy currents develop. Actually, experience shows that in the specific case of a ferro-magnetic rotor this torque increases at a faster rate than, and nearly as the cube of, the magnetic flux density due to the reduction in the magnetic permeability where high-density magnetic fields are present.

As a result, given an equal magnetic flux and therefore an equal weight of the apparatus, it will be advantageous to reduce the magnetic permeability of the rotor by operating under as high magnetic density values as possible. To this end, the flux must be limited to a predetermined value by reducing the active surfaces in relation to the pole teeth and therefore increasing the reluctance of the corresponding magnetic gaps; to meet this requirement, the number of ampere-turns of the winding must be increased proportionally. Thus, the same flux is obtained less economically with respect to the expenditure of ampere-turns, but under a higher magnetic potential, so that for a same weight of the apparatus a higher torque will be obtained. Obviously, if the reluctance were increased at the cost of a greater length of the magnetic gap as measured in the direction of the field, the opposite result would be obtained so that for an equal flux the torque would be reduced.

According to this invention, the possibility of operating with magnetic densities as high as possible, by reducing the active surfaces at the pole teeth, is combined with an improvement in the cooling capacity of the member where the eddy currents are originated and also of the members associated therewith.

For this purpose, the rotor consisting of a hollow body of revolution of ferro-magnetic material, has a thickness considerably greater than the magnetic gaps, this thickness representing for example 6 to 20 times that of said gaps or from 5% to 15% of its diameter, and besides this rotor is so shaped that the active surfaces thereof, i. e. those which are moved between the pole teeth of the field-producing magnetic armature and wherein the eddy currents are circulated, are formed with centrifugal channels consisting of perforations connecting the gap surfaces of opposite polarities, so as to reduce said active surfaces and increase the total surface of the rotor, for instance from 2 to 6 times, with a consequent increase both in the reluctance and in the thermal exchange are of this rotor.

Through these channels or perforations the air is circulated by the centrifugal force developed during the operation of the device.

Certain electro-mechanical apparatus are already known wherein centrifugal cooling channels or the like are provided, but these channels do not lead into magnetic-gap surfaces limiting the active masses in relation to the field, through which dense eddy currents are caused to flow, and besides these channels are not intended to increase the magnetic gap reluctance as in the case contemplated herein.

Furthermore, this invention is concerned, in combination with the arrangements broadly defined hereinabove, with various means intended to increment the rate of heat transfer between the heated body and the cooling fluid, by positively increasing the actual areas of the aforesaid channels. This increase in the channel areas is obtained by providing therein unevennesses such as splines, ribs, threads or the like. This increase in the channel areas may also be obtained fictitiously, according to this invention, by either shaping the channel surfaces or adding ancillary means designed to improve the turbulence of the cooling medium as the latter engages these surfaces, for example by providing ridges or points, changes in section, inserting more or less wrinkled or corrugated sleeves, or introducing of miscellaneous obstacles or baffle means.

This invention is also concerned with the combination of devices of the general type disclosed hereinabove with various means adapted to amplify and accelerate the stream of cooling fluid, through the addition to the pivoting movable member of axial or centrifugal bladings associated with inner or outer baffle means adapted to deflect or draw off air from the surrounding atmosphere in order to blow it onto the operative parts, this blowing action occurring with the maximum intensity internally of said cylindrical body.

The presence of perforations in this body of revolution driven at high speed is likely to induce a hooter-like sound effect. Therefore, according to this invention, the perforations of the active surfaces are formed irregularly in order to avoid, within reasonable and practical limits, too many and simultaneous coincidences between these channels and the edges of the pole pieces, or the said discontinuities are so distributed that the resulting perturbation if any will either be aperiodic or have a frequency outside the normal audible range, preferably in the supersonic range.

The accompanying drawings forming part of this invention illustrate diagrammatically by way of example a few forms of embodiment of the invention, from which other specific features of the invention will become apparent to anybody conversant with the art. In the drawings.

Figure 5A:
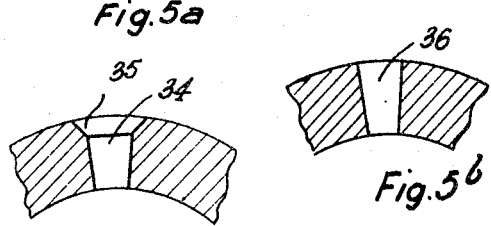
Figure 5B:
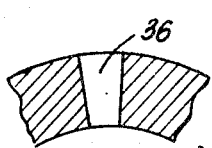

Figures 5a and 5b respectively show at a greater scale and also in fragmentary view two possible modifications of the rotor.

Figure 6:
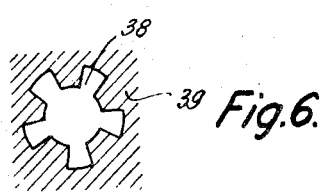

Figure 6 is a plan view showing the cross-sectional profile of a channel.

Figures 7A, 7B:
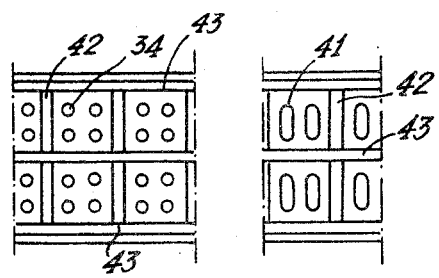

Figure 7a and 7b are respectively developed plan views concerning two modified embodiments of the active surface of the rotor.

Figure 8 is a fragmentary axial section of another modification.

Figures 9a, 9b, 9c, 9d and 9e show in section five possible modifications of the channel surfaces with a view to increasing their total area.

Figure 10 is a diagrammatical axial section showing a different form of embodiment of a rotor.

Figure 11 is also an axial section relating to another variant of the rotor.

Figure 12 is a lateral view of another embodiment of the rotor and

Figure 13 is a developed view showing one possible arrangement of the perforations in the rotor.

Figure 1:
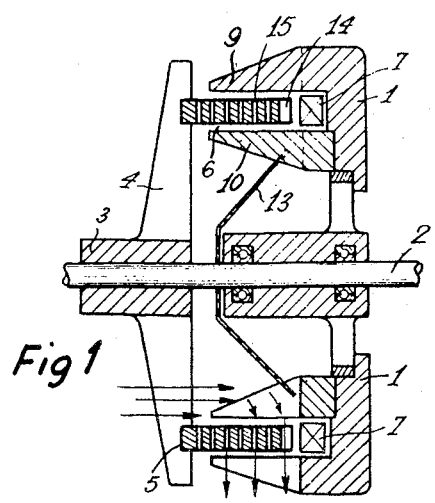
Figure 1 shows in axial section an eddy current brake having its rotor perforated in accordance with the teachings of this invention.

Referring first to the eddy current brake illustrated in Figure 1, the device comprises a stator 1 in which the shaft 2 of a rotor 3 is adapted to rotate freely. This rotor 3 is generally of wheel shape and comprises a set of curved arms or spokes 4 shaped like the blades of a helical fan and supporting in overhanging relationship a rim of ferro-magnetic material constituting a cylindrical or ring-like member the radial thickness of which is about 7% of its diameter, that is considerably more than the magnetic gaps of the device.

This ring member 5 rotates with magnetic gaps which are as small as consistent with thermal expansion conditions in an annular groove 6 formed in the stator 1; in the closed end of this groove there is located a stationary annular winding 7. As the heat developing during the operation of the device originates a centrifugal radial expansion, the inner gap will be kept very narrow and the outer gap will be of greater radial dimension, as measured with the apparatus in its cold or inoperative condition. The stator portion in which the annular groove 6 is formed is also in overhanging relationship to the central portion of the stator and projects toward the latter portion, as shown; this annular, grooved and overhanging portion of the stator 1 is formed with relatively deep notches so as to form an outer ring 9 and an inner ring 10 having circumferentially spaced or open teeth covering the rotor ring 5 partly in the peripheral direction and completely in the direction of its generatrices. These teeth constitute electromagnetic poles all of same sign on a same ring; thus, the teeth of the outer ring 9 may be north poles and those of the inner ring 10 may be south poles. The free space defined between the successive teeth is substantially equal to ⅔ of the polar pitch.

To improve the ventilation of the rotor ring 5 likely to be subjected to relatively high temperatures during the operation of the device, the blades 4 are so directed as to direct an air stream against the stator; the resulting fan may also be of the multistage type to increase its efficiency. A central frusto-conical deflector 13 may be provided in front of the bladings 4 and have or not a corrugated surface to direct the central jets of the incoming air stream not only toward the rotary ring 5 but also toward the notches of the inner ring 10 of pole teeth. Moreover, the free or front end of the rotary ring 5 may be formed with small blades 14 of radial or curved shape, constituting a centrifugal fan. These blades 14 act as cooling and ventilating fins; they draw air from the inner face of ring 5 and force it to the outer face thereof, where it may readily escape through the intervals separating the teeth of the outer ring 9 of the stator.

Figure 2:
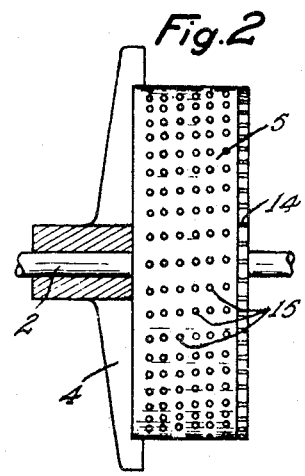
Figure 2 is a lateral view showing the rotor of Figure 1.

As shown in Figs. 1 and 2, the rotor ring 5 is formed with perforations 15 which may not only be radial as shown but also oblique or replaced by elongated slots. These channels force the air centrifugally from the inner face to the outer face of ring 5, said air coming and escaping through the spaces defined between the poles of rings 9 and 10, respectively.

Figure 3:
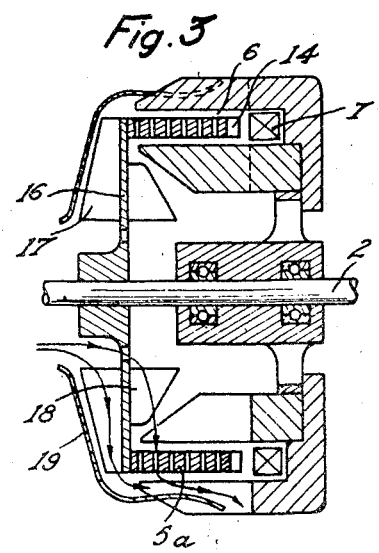
Figure 3 is a modified embodiment of the arrangement shown in Figure 1.

In Fig. 3, a centrifugal fan is substituted for the helical fan of the preceding embodiment. To this end, the rotor ring 5a is wedged on shaft 2 through a disc 16 carrying on either face a set of centrifugal blades 17, 18. The outer blades 17 are designed to blow an air stream formed in a suitably shaped collector 19 on the outer face of the rotor ring 5a; the inner blades 18 produce an air stream flowing through the perforations 18a and sweeping the inner face of the rotor ring 5a, before it merges with the air blown by the outer blades 17 after passing through the channels 15 and blades 14.

A modified arrangement still within the scope of the invention may comprise a pair of coupled stators positioned on either sides of a double centrifugal bladed rotor.

The number of the channels above referred to may attain several hundreds and the total area of their walls is several times—for example 2 to 6 times—that of the initial outer and inner surfaces of the hollow body. Such channels will at first allow a stream of cooling air to flow and accelerate thereacross thereby incrementing to a substantial degree the braking capacity of the device as the latter may be run under considerably heavier loads than if these channels were not provided. In fact, due to the action exerted by the eddy currents, the heat developed thereby might deteriorate the device. Besides, these radial or substantially radial channels do not intersect the general direction of the magnetic field and act themselves as the elements of a centrifugal fan. Furthermore, the provision of these channels improves the magnetic gap reluctance and reduces the magnetic permeability of the rotor, and as a consequence given an equal weight of the apparatus the resulting torque will be higher, provided that the flux is produced under a materially higher magnetic potential.

On the other hand, in an apparatus of this type the magnetic flux escaping from one of the stator pole teeth must compulsorily flow across the whole thickness of the rotor before engaging the opposite tooth. The sum of the input and output flux values across the rotor is therefore subjected to be constant. It is also well known that the sum of the squares or cubes of quantities subject to have a constant sum is minimum when said quantities are equal. Since the torques produced by the eddy currents as measured at each of the rotor surfaces are exactly proportional to the squares or cubes of the magnetic density at these surfaces, it will be advantageous to distribute the magnetic densiy unevenly among the two rotor cylindrical faces, the limits of this unequal distribution being a too high saturation of the corresponding portions of the pole teeth or of the rotor.

Figure 4:
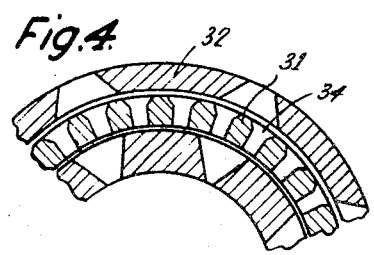
Figure 4 is a fragmentary radial section showing a different embodiment of the armature members.

If we consider now Figs. 4, 5a and 5b of the drawings, it will be seen that this result may be achieved by the provision of tapered channels 36 (Fig. 5b), or by chamferring the outer edge 35 of cylindrical channels 34 (Fig. 5a). Besides, the surface of these channels may be incremented by providing them with a cross-sectional profile having a greater perimeter than that of an ordinary plain hole. A channel of this type is shown at 38 (Fig. 6) as comprising splines 39 affording a substantial increase in the cooling surface; this arrangement is attended by a reduction in the reluctance in relation to that obtained with plain holes, and with this means it is possible to increase the number, and the aggregate thermal efficiency of the channels without enabling the magnetic saturation to overstep reasonable limits.

It is also possible to increase the reluctance by providing channels or groove-like recesses on one or either active face of the rotor. These may alternate or coincide with the rows of channels already described hereinabove.

Figure 7b illustrates in developed view a rotor provided at the same time with recesses 42 parallel to the generatrices of the rotor and also with slots 41 the direction of which is preferably that of the electromotive forces generated, i. e. also the direction of the generatrices and recesses 42. These recesses 42 may also be combined with circular recesses 43 and circular-sectioned channels 34, as illustrated in Fig. 7a.

Still within the scope of the invention, the pole teeth of opposed signs may be shifted in the direction of motion of the rotor or in the opposite direction. Considering a brake of which the rotor is rotated alternately in one or the other direction, it may be advanageous to so arrange the inner teeth of the stator that they will register with the intervals separating the outer teeth of the same stator. Similarly, the number of outer teeth may differ from that of the inner teeth.

Figure 8 shows the provision, on the pole teeth 49, of recesses 48 having the shape of circular grooves. Recesses of this type may be so disposed as to register substantially with the rows of channels, such as 34, formed in the rotor, these various means combining together to increase the reluctance. On the other hand, these recesses 46 may also register with the intervals separating the rows of channels formed on the rotor. The blades 50 provided on the free end of the rotor are disposed preferably in radial fashion so as to be completely coincident with the direction of the magnetic fields; these blades, concurrently with the intervals formed therebetween, increase the reluctance to an appreciable extent and their influence on the braking action as inasmuch efficient as they constitute one of the most efficiently cooled portions of the device, due to their centrifugal blade action exerted on the cooling air stream.

The distribution and number of channels are dependent upon the desired degree of cooling and the specific position of the rotor portions to be cooled.

With this invention it is possible to combine the feature of increased and unequally distributed fluxes, and magnetic densities, with the reduction of the over-all dimensions of the apparatus in a privilege direction.

The various features intended to improve the retarding torque through the above-mentioned magnetic means may also be combined with the different characteristics defined herebelow, which are intended more particularly to promote the transfer of heat from those portions of the apparatus which are subjected to heating and the stream of cooling fluid, while ensuring a better protection of these portions, whether the heat is inherent to the operation of the apparatus or transferred by radiation or convection.

As shown in Figs. 9a to 9c, it is also possible to improve the rotor cooling, given an equal reluctance value. For this purpose, the rotor 61 moving between pole teeth such as 62 and 62a is provided with channels disposed in substantially radial fashion and tapped with threads of any desired profile, such as triangular threads 63 (Fig. 9a), round threads 64 (Fig. 9b), trapezoidal threads 65 (Fig. 9c) or any other types of threads, extending on the whole or part of the channel length.

Still with a view to increasing the thermal transfer, each rotor perforation may be lined with a tube of perforated sheet metal as shown at 66 (Fig. 9d), soldered to the wall of the hole, in order to increase both the total heat transfer area and the turbulence of the air flow. A similar result may be obtained by lining the holes 67 (Fig. 9e) with corrugated wire in the direction of the cylindrical wall, this wire being preferably coiled in the fashion of a coil spring. Moreover, the holes may be lined with profile element of a material having a high coefficient of heat transfer, for example, so that its important surface will be added to that of the hole.

In order to counteract the production of heat, it may be advantageous to construct the rotor in the fashion illustrated in Fig. 10, i. e. by means of a plurality of ring members 78, 79, 80, 81 positioned side by side while leaving intervals 82, 83, 84 therebetween for the circulation of the cooling fluid. Each of the front surfaces which bound these intervals or gaps may advantageously be provided with radial or other cooling and ventilating fins or blades (not shown). These ring members may be assembled in any desired manner, for instance by means of either a number of bolts 85 positioned at spaced intervals, or rods soldered internally and disposed in perforations provided for this purpose in the ring members.

As the heat is transferred nevertheless in an unequal fashion in the different portions of the rotor, it will be advantageous to give it a coincal shape with the smaller diameter on the side where the major heating is likely to occur, the angle of taper being so calculated that the rotor will become again substantially parallel to the generatrices of the magnetic gap during the operation of the device, at the maximum temperature attained in continuous operation. As will appear from Fig. 11, the maximum rotor temperature will lie approximately about the point 76 which is the nearest to the winding and less exposed to the stream of cooling fluid. When cold, the outer surface of the rotor is frusto-conical. When heated by the operation of the device, this rotor will straighten itself and assume the position indicated at 77 in which the rotor surfaces are substantially parallel to the pole faces. With this arrangement, it is possible to avoid the provision of a substantial gap and an exaggerate expenditure of magnetizing ampere-turns.

In order to obtain a reliable operation with magnetic gaps having the smallest possible dimensions, the increase in diameter of the rotor 91 under the influence of heat may be reduced to a substantial extent by providing expansion slots 90 conveniently distributed around its circumference (see Fig. 12). These slots 90, extending preferably throughout the radial thickness of the rotor 91, may be directed either in the direction parallel to the generatrices or at an angle thereto. They may be staggered so that one set of slots open on the front face and the other on the opposite face of the rotor.

The inner surfaces of these slots 90 may be provided with cooling fins or venilating blades.

As the heat developed in the rotor is likely to spread along the arms thereof, these may advantageously be so designed and arranged that they will be subjected to the thermal expansion of the rotor without however exerting any detrimental influence on the position and centering thereof.

As clearly shown in Fig. 13, to avoid a hooter-like effect resulting from the passage of the perforations past the edge lines of the pole teeth 69, these perforations are distributed along lines $e_1$, $f_1$, $e_2$, $f_2$, . . . set at an angle to the generatrices; these lines may be straight or not; the distribution is so arranged that the holes of a same row will not move simultaneously past the pole edges. To either avoid any unpleasant periodic character of the perturbation, or throw the period concerned outside the range of audible sounds, the pitch of these rows of perforations may be varied or the perforations so arranged that their apparent diameters will in no case be coincident with one another on a same line.

What I claim is:

1. An electrodynamic eddy current brake of the homopolar type comprising, in combination, a stator having two annular sets of circumerentially spaced teeth forming pole pieces, said two sets being spaced concentrically from each other so as to form an annular interval therebetween, a rotor comprising a rotary shaft, a hub provided with arms and secured to said shaft, and a cylindrical hollow body mounted in overhanging relationship on said arms and extending across said annular interval of said stator, said cylindrical hollow body consisting of ferromagnetic material and having a thickness materially greater than the gaps formed between said body and said two annular sets of teeth, a stationary annular winding mounted in said annular interval so as to register with the free end face of said cylindrical hollow body, whereby all the teeth of the same annular set act as poles having the same polarity when said winding is energized, means for simultaneously incrementing the reluctance of said cylindrical hollow body, increasing the heat transfer surface of said body, and circulating air drawn from the surrounding atmosphere across the spaces defined between the poles, and means for withstanding the effects of dilatation on said body.

2. An eddy current brake according to claim 1, wherein the thickness of said cylindrical hollow body represents from 5% to 15% of its outer diameter.

3. An eddy current brake according to claim 1, wherein the inner gap between the inner cylindrical wall of said body and the outer face of the inner annular set of pole pieces, at room temperature, is smaller than the gap between the outer cylindrical wall of said body and the inner face of the outer annular set of pole pieces to withstand the effects of dilatation on said body.

4. An eddy current brake according to claim 1, wherein said cylindrical hollow body is formed in at least one portion of its radial dimension with thermal expansion slots disposed in substantially parallel relationship to said rotary shaft to withstand the effects of dilatation on said body.

5. An eddy current brake according to claim 1, wherein said cylindrical hollow body is formed with centrifugal channels extending from one to the other of the gap surfaces of opposite polarity, thereby decreasing the active areas thereof which in operation register with the poles of the device, said channels acting simultaneously as means for incrementing the reluctance of said body due to the decreasing of its active areas registering with the poles of the device, for increasing the heat transfer surface of said body due to the increasing of its surface in contact with the surrounding atmosphere and for circulating air drawn from the surrounding atmosphere from its inner surface to its outer surface, said air coming and escaping through the spaces defined between the pole teeth of both annular sets, respectively.

6. An eddy current brake according to claim 5, further comprising means for accelerating and amplifying the stream of atmospheric cooling air, said last means comprising a fan-like impeller blading rigid with said arms supporting said cylindrical hollow body, and at least one baffle means adapted to deflect the jets of cooling air toward the inlet of the centrifugal channels, said baffle being fast with said stator.

7. An eddy current brake according to claim 5, wherein the aggregate surface of the walls of said centrifugal channels is two to six times that of the rotor considered without said channels.

8. An electrodynamic eddy current brake of the homopolar type comprising, in combination, a stator having two annular sets of circumferentially spaced teeth forming pole pieces, said two sets being spaced concentrically from each other so as to form an annular interval therebetween, a rotor comprising a rotary shaft, a hub provided with arms and secured to said shaft, and a cylindrical hollow body mounted in overhanging relationship on said arms and extending across said annular interval of said stator, said cylindrical hollow body consisting of ferro-magnetic material and having a thickness materially greater than the gaps formed between said body and said two annular sets of teeth, said body being formed with a set of substantially radial channels acting as many centrifugal fan elements, a stationary annular winding mounted in said annular interval so as to register with the free end face of said cylindrical body, whereby all the teeth of the same annular set act as poles having the same polarity when said winding is energized, means for accelerating and amplifying the stream of atmospheric air generated by the displacement of said channels, means for incrementing the inner heat transfer surface internally of said channels while preserving for said channels a cross-sectional area adapted to maintain at the desired value the reluctance of said cylindrical hollow body, and means for unequally distributing the magnetic density among the two cylindrical faces of said cylindrical hollow body.

9. An eddy current brake device according to claim 8, wherein said arms supporting said cylindrical hollow body are curved like air-fan blades.

10. An eddy current brake according to claim 8, wherein said means for accelerating and amplifying said stream of atmospheric air comprises a fan-like impeller blading fast with the arms supporting said cylindrical hollow body, and at least one baffle means adapted to deflect the jets of cooling air toward the inlet of the channels and which is fast with said stator.

11. An eddy current brake according to claim 8, wherein each radial channel is formed with inner ribs designed to increment its inner heat transfer surface.

12. An eddy current brake according to claim 8, wherein said means for incrementing the inner heat transfer surface of each channel consists of a tube section of perforated sheet metal mounted in said channel and soldered to the inner wall thereof.

13. An eddy current brake according to claim 8, wherein said means for incrementing the inner heat transfer surface of each channel consists of a wire corrugated parallelly to the inner wall of said channel, wound in coil fashion and fitted in said channel.

14. An eddy current brake according to claim 8, wherein groove-like recesses are formed in at least one of the operative surfaces of said cylindrical hollow body and so arranged as to ensure an unequal distribution of the magnetic density among the two cylindrical faces of said body, said groove-like recesses acting further simultaneously as means for increasing the reluctance of said body and for allowing the air to escape through the channels when the latter are positioned in registering relationship with the pole teeth.

15. An eddy current brake according to claim 8, wherein said radial channels have a tapered profile to ensure an unequal distribution of the magnetic density.

16. An eddy current brake according to claim 8, wherein each channel is formed at one of its ends with a chamferred edge designed to ensure an unequal distribution of the magnetic density.

17. An eddy current brake according to claim 8, wherein the pole teeth of at least one of said annular sets are formed with recesses intended to ensure an unequal distribution of the magnetic density and simultaneously the circulation of air through the channels when the latter are positioned in registering relationship with the pole teeth.

18. An eddy current brake according to claim 8, wherein the pole teeth of one annular set are angularly shifted in relation to those of the other set in order to ensure an unequal distribution of the magnetic density.

19. An eddy current brake according to claim 8, wherein the number of pole teeth of one set differs from that of the other set in order to ensure an unequal distribution of the magnetic density.

20. An eddy current brake according to claim 8, wherein said channels are distributed in rows disposed obliquely with respect to the generatrices of said cylindrical hollow body, in order to attenuate the hooter effect during the operation of the brake.

21. An eddy current brake according to claim 20, wherein the pitch of said channels in said rows varies along the periphery of said cylindrical hollow body.

22. An electrodynamic eddy current brake of the homopolar type comprising, in combination, a stator having two annular sets of circumferentially spaced teeth forming pole pieces, said two sets being spaced concentrically from each other so as to form an annular interval therebetween, a rotor comprising a rotary shaft, a hub provided with arms and secured to said shaft, a series of aligned cylindrical hollow bodies mounted in overhanging relationship on said arms and extending across said annular interval, and means for connecting said cylindrical hollow bodies with one another, said bodies consisting of ferro-magnetic material and having a thickness materially greater than that of the gaps formed between said bodies and said two annular sets of teeth, a stationary annular winding mounted in said interval and registering with the free front face of said cylindrical hollow bodies, whereby all the teeth of the same annular set act as poles having the same polarity when said winding is energized, and means for simultaneously incrementing the reluctance of said cylindrical hollow bodies, increasing the heat transfer surfaces of said bodies and circulating cooling air drawn from the surrounding atmosphere across the spaces defined between the teeth.

23. An electrodynamic eddy current brake of the homopolar type comprising, in combination, a stator having two annular sets of circumferentially spaced teeth forming pole pieces, said two sets being spaced concentrically from each other so as to form an annular interval therebetween, a rotor comprising a rotary shaft, a hub provided with arms and secured to said shaft, and a body of revolution mounted in overhanging relationship on said arms and extending across said annular interval, the outer surface of said body being slightly tapered in order to reduce the thickness of said body in the direction toward its free front face, said body consisting of ferro-magnetic material and having a thickness materially greater than the gaps formed between said body and said two annular sets of teeth, a stationary annular winding mounted in said interval so as to register with said free front face of said tapered body, whereby all the teeth of the same annular set act as poles having the same polarity when said winding is energized, and means for simultaneously incrementing the reluctance of said tapered body, increasing the heat transfer surface of said body and circulating air drawn from the surrounding atmosphere across the spaces defined between the teeth.

24. An eddy current brake according to claim 1, further comprising air-circulating blades mounted on the free end face of said cylindrical hollow body.

25. An eddy current brake according to claim 1, further comprising blades mounted on the free end face of said cylindrical hollow body and extending therefrom to define a centrifugal fan.

References Cited in the file of this patent
UNITED STATES PATENTS

| | | |
|---|---|---|
| 2,488,079 | Lavaud | Nov. 15, 1949 |
| 2,630,466 | Landis | May 3, 1953 |

FOREIGN PATENTS

| | | |
|---|---|---|
| 445,347 | Great Britain | Mar. 30, 1936 |
| 629,919 | Great Britain | Sept. 30, 1949 |